US011919676B2

(12) United States Patent
Bishop

(10) Patent No.: US 11,919,676 B2
(45) Date of Patent: Mar. 5, 2024

(54) UTILITY SYSTEM

(71) Applicant: Bailey Bishop, San Diego, CA (US)

(72) Inventor: Bailey Bishop, San Diego, CA (US)

( * ) Notice: Subject to any disclaimer, the term of this patent is extended or adjusted under 35 U.S.C. 154(b) by 0 days.

(21) Appl. No.: 17/664,836

(22) Filed: May 24, 2022

(65) Prior Publication Data

US 2022/0380090 A1 Dec. 1, 2022

Related U.S. Application Data

(60) Provisional application No. 63/193,695, filed on May 27, 2021.

(51) Int. Cl.
| | |
|---|---|
| B65D 25/04 | (2006.01) |
| A45C 11/20 | (2006.01) |
| A47J 47/00 | (2006.01) |
| B65D 6/02 | (2006.01) |
| B65D 25/28 | (2006.01) |

(52) U.S. Cl.
CPC .............. B65D 25/04 (2013.01); A45C 11/20 (2013.01); A47J 47/005 (2013.01); B65D 25/2805 (2013.01); *B65D 9/06* (2013.01)

(58) Field of Classification Search
CPC ... B65D 9/00; B65D 9/06; B65D 9/10; B65D 43/022; A45C 11/20; A45F 3/16; A47J 47/16

USPC ................ 220/23.88; 206/546, 549, 542
See application file for complete search history.

(56) References Cited

U.S. PATENT DOCUMENTS

| | | | | |
|---|---|---|---|---|
| 3,556,339 | A | * | 1/1971 | Lind ................... B65D 43/021 220/788 |
| 6,343,708 | B1 | * | 2/2002 | Riso ........................ B25H 3/02 220/23.88 |
| 8,516,848 | B2 | * | 8/2013 | White ...................... A45C 13/02 62/465 |
| 8,863,546 | B2 | * | 10/2014 | Oberweis .................. F25D 3/14 62/441 |
| 2011/0220531 | A1 | * | 9/2011 | Meether .................... B62B 3/02 206/508 |
| 2022/0363457 | A1 | * | 11/2022 | Hession ............... B65D 43/022 |

FOREIGN PATENT DOCUMENTS

FR 904072 A * 10/1945

* cited by examiner

*Primary Examiner* — Mollie Impink

(74) *Attorney, Agent, or Firm* — SHIMOKAJI IP

(57) ABSTRACT

A utility system comprises a plurality of side walls; a top wall that is configured to be nested to the side walls whereby the top wall can engage and disengage from the side walls; a divider within an interior of the utility system; and a container that is removable from and insertable into the interior of the utility system.

6 Claims, 2 Drawing Sheets

UTILITY SYSTEM

CROSS REFERENCE TO RELATED APPLICATIONS

This application claims priority to and the benefit of U.S. Provisional application No. 63/193,695, filed May 27, 2021, which is incorporated herein in its entirety.

BACKGROUND OF THE DISCLOSURE

The present disclosure generally relates to utility systems and, more particularly, to apparatus and methods of storing and using different types and sizes of items in a compact fashion.

People who camp often find it necessary to bring different types and sizes of items, especially as those items related to preparing and cleaning a campsite, starting a campfire, eating, first aid, and seeing at night. Those items can include utensils, plates, pans, campfire lighting equipment, headlamps and lanterns, for example.

As can be seen, there is a need for improved apparatus and methods for storing and using different types and sizes of items in a compact fashion, such as those used for camping.

SUMMARY OF THE DISCLOSURE

In one aspect of the present invention, a utility system comprises a plurality of side walls; a top wall that is configured to be nested to the side walls whereby the top wall can engage and disengage from the side walls for additional use of the interior surface; a divider within an interior of the utility system; and a container that is removable from and insertable into the interior of the utility system These and other features, aspects and advantages of the present disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present disclosure provides apparatus and methods for storing items of different types and sizes in a compact fashion. Generally, the present disclosure can provide a portable multipurpose camping box with compartments for storing and organizing outdoor campsite and food preparation goods, cooking utensils, first aid, clean-up items and other camping related gear, including an integrated cutting board, a separate caddy for table-top items and a separate pouch for grilling utensils.

In embodiments, a nestable lid can be opened to reveal divided tray assemblies. The lid can have a finger pull cut-out which can be used to open the box. The lid interior surface may serve as a cutting board and may have a routed juice catch around a perimeter of the lid. The flush nested lid top can enable the top surface thereof to be used comfortably as a seat. A removable table-top caddy and a roll-style utensil pouch can make dining and grilling utensils more accessible. A large box divider can keep gear stacked upright and visible. Interior graphics throughout may provide instructions for returning items to their correct location to maintain the compact organized assembly.

Figure 1:
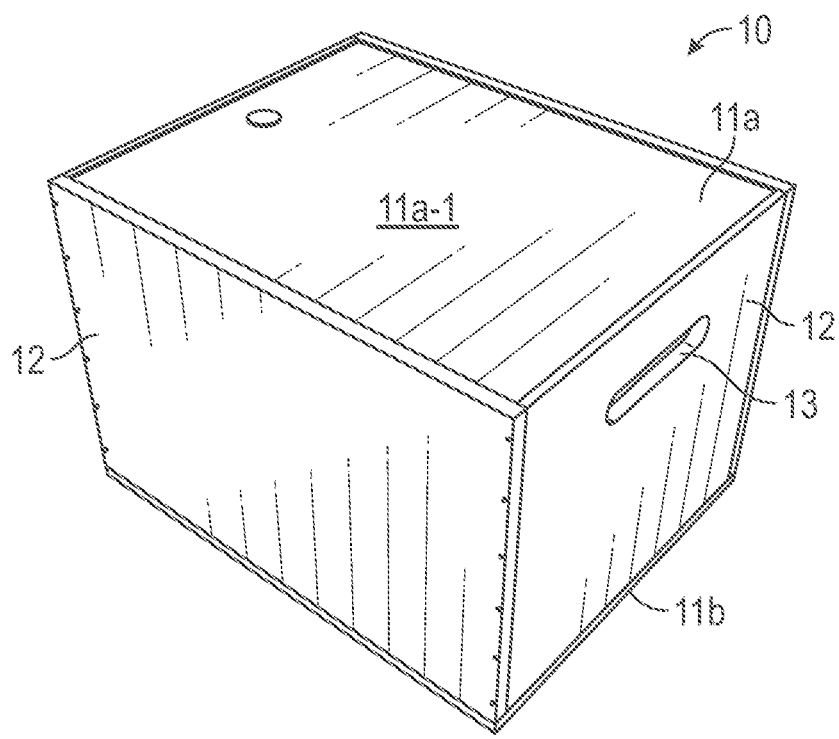
FIG. 1 is a perspective view of an exterior of a utility system according to an embodiment of the present disclosure.
Figure 3:
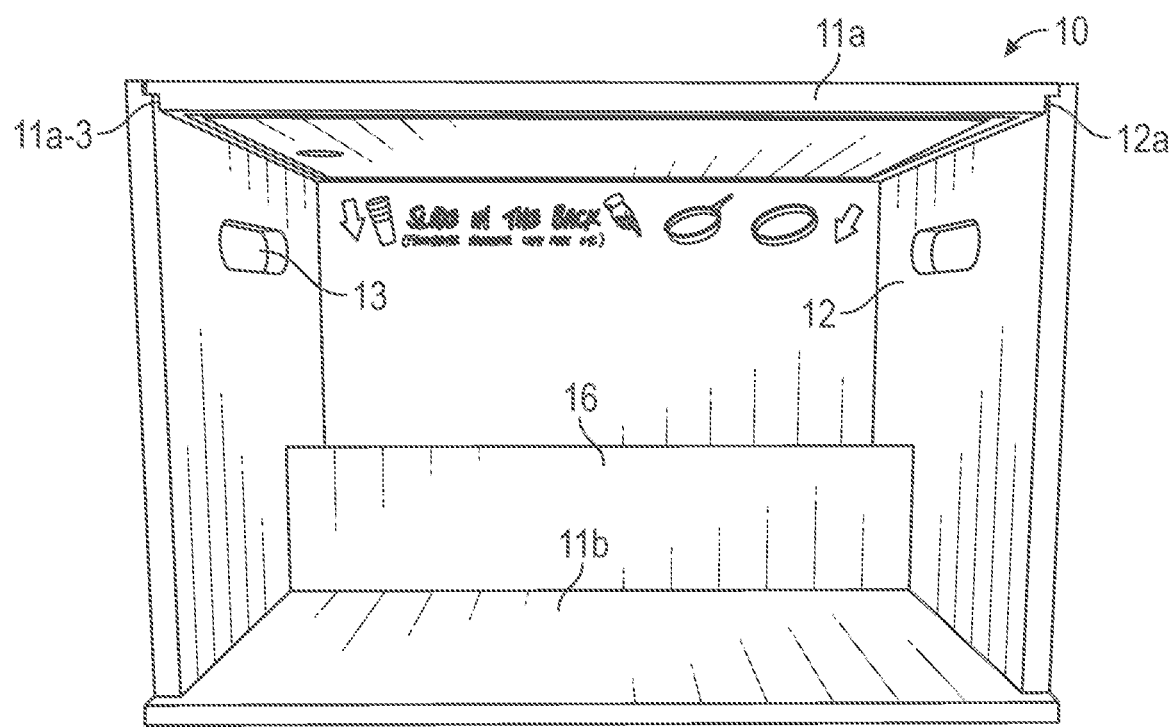
FIG. 3 is a perspective view of an interior of utility system according to an embodiment of the present disclosure.

In FIG. 1, in an embodiment, a utility system or box 10 can include four side walls 12, a top wall 11a and a bottom wall 11b. In embodiments, two opposing side walls 12 can include along a "top" edge thereof a stepped shaped edge 12a (FIG. 3). The top wall 11a can include along a "bottom" edge thereof a stepped shaped 11a-3 that mirrors the stepped shaped edges 12a (FIG. 3). In other words, the configurations of the stepped shaped edges 11a-3, 12a enable them to interface and mate with one another.

Thereby, in an embodiment, the top wall 11a can be configured to nest to the side walls 12, whereby the top wall 11a can engage and disengage from the side walls 12. The top wall 11a may also be removed to reveal an interior of the utility system 10 and thereby enable access to the interior by a user. In some embodiments, one or more of the side walls 12 can have a slot 13 that may serve as a handle for the user to grasp the utility box 10.

Figure 2:
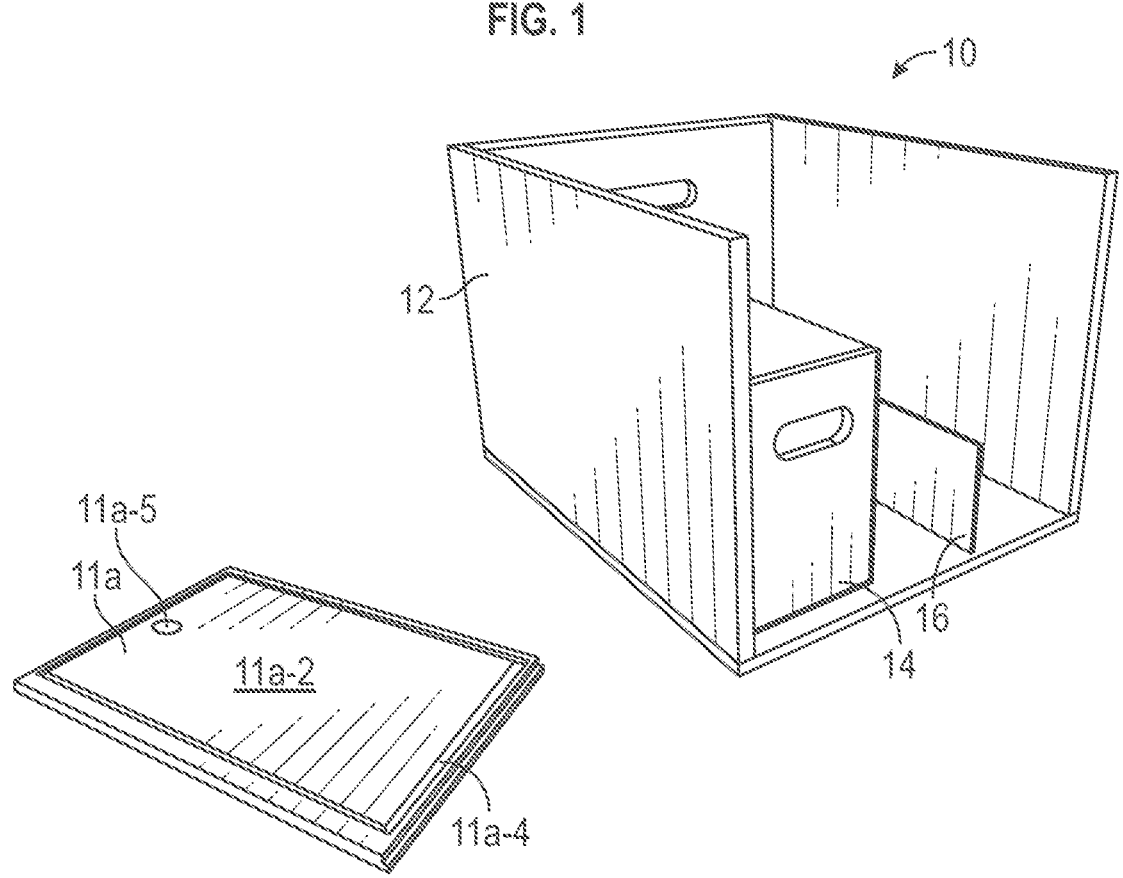
FIG. 2 is a partial, exploded perspective view of a utility system according to an embodiment of the present disclosure.

In FIG. 2, in embodiments, the top wall 11a may be made of a rigid material, such as wood. The top wall 11a may be configured to enable the top wall 11a to be used as a cutting board or a seat bottom for a user. For example, when the top wall 11a is nested on the side walls 12, a "top" side 11a-1 of the top wall 11a can be used as a seat bottom. In another example, when the top wall 11a is removed from the side walls 12, a "bottom" side 11a-2 of the top wall 11a can be used as a cutting board. In other exemplary embodiments, the top wall 11a and/or side walls 12 can be made of cardboard or polyethylene terephthalate (PET), as examples.

In FIG. 2, in an embodiment, the "bottom" side 11a-2 of the top wall 11a may also include a liquid catch 11a-4. In an embodiment, the liquid catch 11a-4 may be a raised ridge along a perimeter of the "bottom" side 11a-2.

In FIG. 2, in an embodiment, the top wall 11a may include a hole 11a-5 which can be configured as a finger pull.

In FIG. 2, an interior of the utility system 10, according to an embodiment, can be used to store items therein. For example, plates, forks, and knives can be stored. In embodiments, a rolled-up pouch of items can be stored in the utility system 10.

In FIGS. 2 and 3, in an embodiment, the utility system 10 may include in the interior thereof a divider 16. The divider 16 can serve to divide the interior of the utility system 10 to enable more efficient storing of items and/or prevent stored items from shifting while the utility system 10 is moved. In some embodiments, the divider 16 can be removable from the interior of the utility system 10. In other embodiments, the divider 16 can be fixed within the interior of the utility system 10.

In embodiments, the divider 16 can be rectangular shaped. In embodiments, a height of the divider 16 may be less than a height of the interior of the system 10. In embodiments, a length of the divider 16 may be equal to an interior length of the system 10. In embodiments, the divider 16 can be made of wood or cardboard or plastic or other materials.

Figure 4:
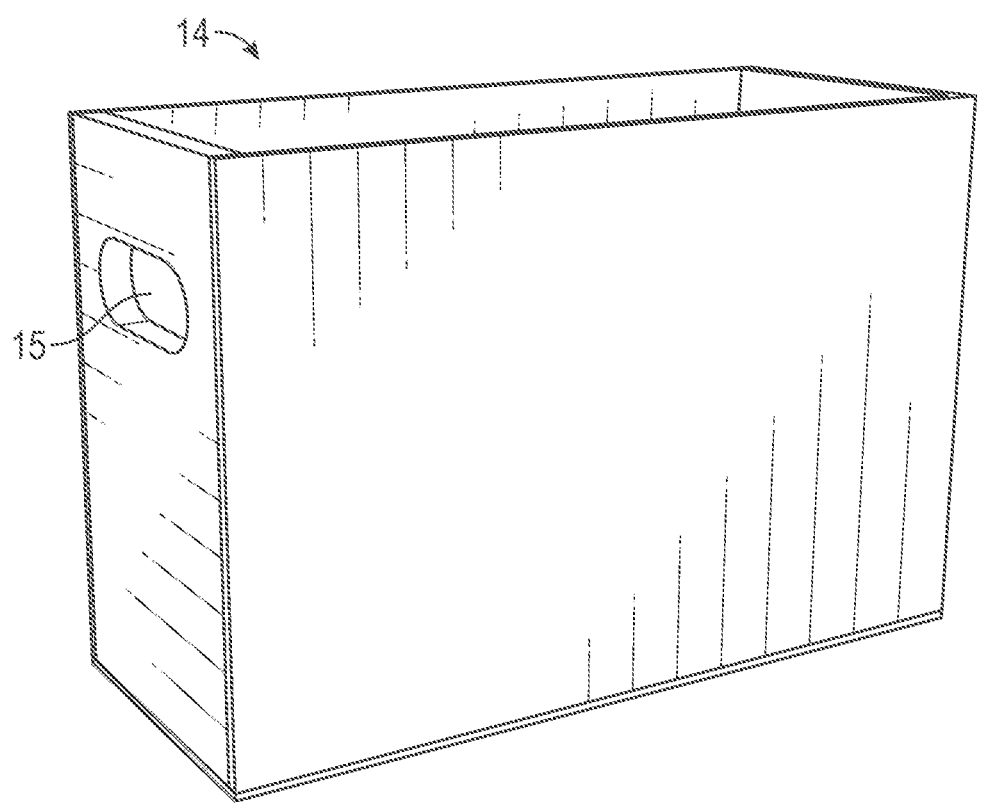
FIG. 4 is a perspective view of a removable tray for a utility system according to an embodiment of the present disclosure.

In FIGS. 2 and 4, in embodiments, the utility system 10 may include in the interior thereof a container 14. The container 16 can serve to divide the interior of the utility system 10 to enable more efficient storing of items and/or hold stored items and/or prevent items from shifting while the utility system 10 is moved. In some embodiments, the container 14 can be removable from the interior of the utility system 10. In other embodiments, the container 14 can be fixed within the interior of the utility system 10. The container 14 may have one or more slots 15 that can serve as a handle, in embodiments.

In embodiments, the container 14 can be rectangular shaped. In embodiments, a height of the container 14 may be less than a height of the interior of the system 10. In embodiments, a length of the container 14 may be equal to an interior length of the system 10. In embodiments, the container 14 may be made of wood or cardboard or plastic or other materials.

As mentioned above, the utility system 10 may include a removable pouch. The pouch can serve to hold stored items within the utility system 10, as well as outside of the utility system 10. In embodiments, the pouch may be sized and configured to lay within the interior of the utility system 10 when used to store items.

In embodiments, instructions for the use of the utility system 10 can be within an interior or exterior thereof. In embodiments, the instructions can be imprinted one the interior or exterior of one or more of the walls 11a, 11b, 12.

It should be understood, of course, that the foregoing relates to exemplary embodiments of the disclosure and that modifications may be made without departing from the spirit and scope of the disclosure as set forth in the following claims.

I claim:

1. A utility system, comprising:
   a plurality of side walls;
   wherein two opposed stepped side walls of the plurality of sidewalls include a stepped shape along an entire top edge;
   wherein two opposed non-stepped side walls of the plurality of sidewalls have an absence of the stepped shape along an entire respective top edge;
   a top wall that is configured to be nested in the two stepped side walls whereby the top wall can engage and disengage from the two stepped side walls;
   wherein the top wall includes along two opposite edges thereof a stepped shape configuration that mirrors the stepped shape configuration of the top edges of the two stepped side walls;
   whereby the two opposite edges of the top wall can mate with the top edges of the two stepped side walls;
   wherein, when the top wall is nested in the two stepped side walls, a top surface of the top wall and uppermost reaches of the top edges of the two stepped side walls are all on a single plane;
   a divider within an interior of the utility system; and
   a container that is removable from and insertable into the interior of the utility system.

2. The system of claim 1, wherein:
   at least one side wall includes a slot configured to be used as a handle.

3. The system of claim 1, wherein:
   the top wall includes a hole configured to be used as a finger pull.

4. The system of claim 1, wherein:
   the top wall is configured as seat bottom and a cutting board.

5. The system of claim 1, further comprising written instructions on the use of the system, wherein the instructions are imprinted on at least one of the top and side walls.

6. A utility system, comprising:
   a plurality of side walls that include a stepped shape along top edges thereof;
   a top wall that is configured to be nested in the plurality of side walls whereby the top wall can engage and disengage from the side walls;
   wherein the top wall includes a stepped shape along perimeter edges thereof that mirrors the stepped shape configuration of the top edges of the plurality of side walls;
   wherein the top wall includes a bottom surface having a raised ridge that is inwardly of and separated from the perimeter edges of the top wall, and that extends along the perimeter edges of the top wall;
   a non-removable divider within an interior of the utility system;
   wherein the non-removable divider is a single interior wall having a height that is less than a height of the plurality of side walls;
   wherein the non-removable divider has a length that extends from one side wall to an opposing side wall; and
   a container that is removable from and insertable into the interior of the utility system;
   wherein the container has a height which is greater than the height of the single interior wall and which is less than the height of the plurality of side walls;
   wherein lengths of the container and of the non-removable divider extend in the same direction.

* * * * *